United States Patent
Pyo et al.

(10) Patent No.: US 9,329,725 B2
(45) Date of Patent: *May 3, 2016

(54) DISPLAY DEVICE INCLUDING TOUCH SCREEN COMPENSATION AND TOUCH SENSING METHOD THEREOF

(71) Applicant: LG Display Co., Ltd., Seoul (KR)

(72) Inventors: Seung Eun Pyo, Incheon (KR); Sung Chul Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/742,414

(22) Filed: Jun. 17, 2015

(65) Prior Publication Data

US 2015/0286339 A1    Oct. 8, 2015

Related U.S. Application Data

(63) Continuation of application No. 13/872,254, filed on Apr. 29, 2013, now Pat. No. 9,086,771.

(30) Foreign Application Priority Data

Dec. 19, 2012    (KR) .......................... 10-2012-0149028

(51) Int. Cl.
*G06F 3/041* (2006.01)
*G06F 3/044* (2006.01)
*G09G 3/36* (2006.01)

(52) U.S. Cl.
CPC .............. *G06F 3/0418* (2013.01); *G06F 3/044* (2013.01); *G06F 3/0412* (2013.01); *G09G 3/3666* (2013.01); *G09G 2310/08* (2013.01)

(58) Field of Classification Search
CPC ....................................................... G06F 3/0412
See application file for complete search history.

(56) References Cited

U.S. PATENT DOCUMENTS

| 2003/0048261 A1* | 3/2003 | Yamamoto ........... G09G 3/3648 345/173 |
| 2011/0298746 A1* | 12/2011 | Hotelling ................ G06F 3/044 345/174 |
| 2012/0169636 A1 | 7/2012 | Liu |
| 2013/0076647 A1 | 3/2013 | Yousefpor et al. |
| 2013/0082977 A1* | 4/2013 | Noguchi ............... G06F 3/0412 345/174 |

* cited by examiner

*Primary Examiner* — Gerald Johnson
*Assistant Examiner* — Maheen Javed
(74) *Attorney, Agent, or Firm* — Morgan, Lewis & Bockius LLP

(57) ABSTRACT

A display device comprises a timing controller and a touch sensing unit. The timing controller drives a display panel such that a display mode for displaying an image in the display panel and a touch mode for sensing a user's touch are alternately driven. The touch sensing unit differentially applies DTX (display touch crosstalk) compensation values by compensation area to sense the user's touch in the touch mode, each of touch sensing block being a sensing unit for a user's touch. Each compensation area is set based on a distance between a data driver and the compensation area. Each DTX compensation value is a value for compensating for an error of touch data caused by changes in respective grayscale values applied to pixels corresponding to a specific touch sensing block. The touch sensing blocks are divided in a column direction depending on arrangement of multiplexers in the data driver.

7 Claims, 11 Drawing Sheets

DISPLAY DEVICE INCLUDING TOUCH SCREEN COMPENSATION AND TOUCH SENSING METHOD THEREOF

CROSS-REFERENCE TO RELATED APPLICATIONS

This application is a continuation of co-pending U.S. patent application Ser. No. 13/872,254, filed on Apr. 29, 2013, which claims the benefit of the Korean Patent Application No. 10-2012-0149028 filed on Dec. 19, 2012, which is hereby incorporated by reference as if fully set forth herein.

BACKGROUND

1. Field of the Invention

The present invention relates to a display device and a touch sensing method thereof, and more particularly, to a display device with a built-in touch sensor and a touch sensing method thereof.

2. Discussion of the Related Art

With the advancement of various portable electronic devices such as mobile terminals and notebook computers, the demand for flat panel display devices applied to the portable electronic devices is increasing.

Liquid crystal display (LCD) devices, plasma display panels (PDPs), field emission display (FED) devices, light emitting diode (LED) display devices, and organic light emitting diode (OLED) display devices have been developed as flat panel display devices.

In such flat panel display devices, LCD devices are easily manufactured by advanced manufacturing technology and have drivability of drivers, low power consumption, high image quality, and a large screen, and thus, the application fields of the LCD devices are being expanded. LCD devices, including a built-in touch screen that enables a user to directly input information to a screen with a finger or a pen, are attracting much attention.

In applying a touch screen to LCD devices, a separately prepared touch panel is conventionally disposed on a liquid crystal panel, but, the LCD devices are recently developed in a type where the touch screen is built in a liquid crystal panel for slimming.

Especially, LCD devices using the existing elements, such as common electrodes formed in a lower substrate, as touch sensing electrodes are called in-cell touch type LCD devices.

In the in-cell touch type LCD devices, a plurality of common electrodes formed in a lower substrate (TFT array substrate) are used for display, and moreover used as touch electrodes. In this case, the common electrodes are divided in units of pixels to configure a plurality of touch sensing blocks.

Specifically, among a plurality of pixels provided in the LCD device, a certain number of pixels (for example, 64×64 pixels) configures one touch sensing block. A plurality of touch sensing blocks are connected to each other in an X-axis direction to configure a plurality of touch driving electrodes, and a plurality of touch sensing electrodes are arranged in a stripe type in a Y-axis direction. The touch driving electrodes may be arranged in the X-axis direction identically to a direction of a gate line, and the touch sensing electrodes may be arranged in the Y-axis direction identically to a direction of a data line.

In this case, a touch driving signal is applied to the touch driving electrodes, and the touch sensing electrodes sense a capacitance change.

In the in-cell type touch LCD devices, display and touch sensing are temporally divided and driven due to a structural characteristic in which a plurality of pixels for display and a touch screen for touch detection are provided together.

During a touch sensing period (non-display period), when a capacitance is changed in a touch sensing block touched by a user's finger, a touch sensing electrode senses the changed capacitance, thereby determining whether there is the user's touch and a touched position.

In the related art, however, when touch sensors are disposed outside a liquid crystal panel, a display function and a touch sensing function are separately performed, and thus are not affected by each other. On the other hand, when the touch sensors are built in the liquid crystal panel, the display function and the touch sensing function are affected by each other. That is, touch sensing driving can affect display driving, or, the display driving can affect the touch sensing driving. This will now be described in more detail with reference to FIG. 1.

FIG. 1 is a view showing a capacitance change in a pixel displaying black and a capacitance change in a pixel displaying white, in the related art in-cell touch type LCD device.

As seen in FIG. 1, a pixel "Black" displaying black and a pixel "White" displaying white differ in alignment of liquid crystal, and thus, a difference between capacitances of a liquid crystal layer occurs.

The capacitance difference between pixels is maintained in the pixels even after a touch sensing period is started, and affects touch sensitivity. The capacitance difference functioning like offset to act as noise to touch sensing is called display to touch crosstalk (DTX).

FIG. 2 is a diagram showing a touch raw data difference between a touch sensing block displaying black and a touch sensing block displaying white in the related art in-cell touch type LCD device.

As seen in FIG. 2, the touch raw data difference between the touch sensing block displaying black and the touch sensing block displaying white is an average of 150. That is, even when there is no user's touch, a touch raw data difference is caused by a difference of display information displayed by a pixel corresponding to a corresponding touch sensing block.

For this reason, when a touch threshold value for detecting whether there is a user's touch is 100, even though there is no user's actual touch, a touch can be sensed.

SUMMARY

Accordingly, the present invention is directed to provide a display device and a touch sensing method thereof that substantially obviate one or more problems due to limitations and disadvantages of the related art.

An aspect of the present invention is directed to provide a display device and a touch sensing method thereof, which correct display touch crosstalk to sense a user's touch.

Another aspect of the present invention is directed to provide a display device and a touch sensing method thereof, which correct display touch crosstalk to a user's touch, thus enhancing a touch sensing rate.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a display device including: a timing controller temporally dividing one frame period and driving a display panel such that a display mode for displaying an image in the display panel and a touch mode for sensing a user's touch are alternately driven; and a touch sensing unit setting a plurality of compensation areas including at least one or more touch sensing blocks, and differentially applying DTX compensation values by compensation area to sense the user's touch in the touch mode, each of the touch sensing blocks being a sensing unit for a user's touch, wherein, each of the compensation areas is set to a predetermined width based on a distance between a data driver and the compensation area, and each of the DTX compensation values is a value for compensating for an error of touch data caused by changes in respective grayscale values applied to pixels corresponding to a specific touch sensing block.

In another aspect of the present invention, there is provided a touch sensing method of a display device, which temporally divides one frame period and drives a display panel such that a display mode for displaying an image in the display panel and a touch mode for sensing a user's touch are alternately driven, including: setting a plurality of compensation areas, including at least one or more touch sensing blocks, based on a distance separated from a data driver in the touch mode, each of the touch sensing blocks being a sensing unit for a user's touch; and differentially applying DTX compensation values by compensation area to sense the user's touch.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Hereinafter, a display device and a touch sensing method thereof according to the present invention will be described in detail with reference to the accompanying drawings.

In an embodiment, a display device according to the present invention may be an LCD device. Hereinafter, for convenience, the LCD device will be described as an example of the display device according to the present invention. However, the display device according to the present invention is not limited to the LCD device.

LCD devices are variously developed in a twisted nematic (TN) mode, a vertical alignment (VA) mode, an in-plane switching (IPS) mode, or a fringe field switching (FFS) mode depending on a scheme of adjusting the alignment of liquid crystal.

In such modes, the IPS mode and the FFS mode are modes in which a plurality of pixel electrodes and a common electrode are arranged on a lower substrate, and thus, the alignment of liquid crystal is adjusted with electric fields between the pixel electrodes and the common electrode.

The present invention may be applied to an LCD device having a structure in which a plurality of pixels electrodes and common electrodes are disposed on a lower substrate as in the IPS mode or the FFS mode.

However, the present invention is not limited thereto, and may be an LCD device having a structure in which the pixel electrodes are disposed on the lower substrate and the common electrodes are disposed on an upper substrate as in the TN mode or the VA mode.

<First Embodiment of Display Device>

Figure 1:
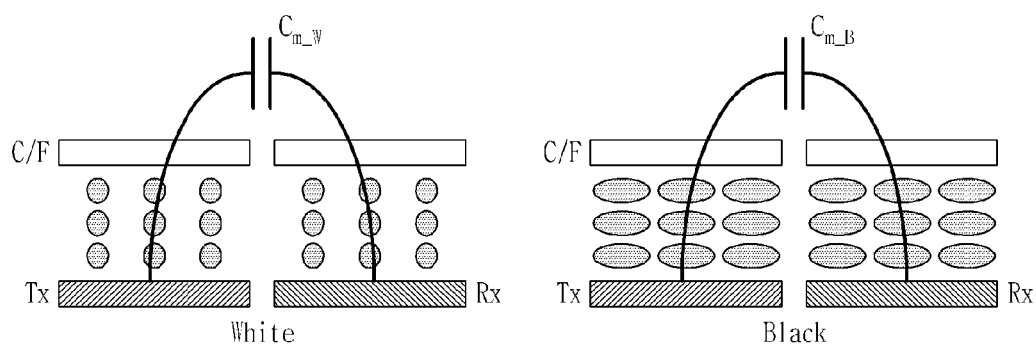
FIG. 1 is a view showing a capacitance change in a pixel displaying black and a capacitance change in a pixel displaying white, in the related art in-cell touch type LCD device.
Figure 2:
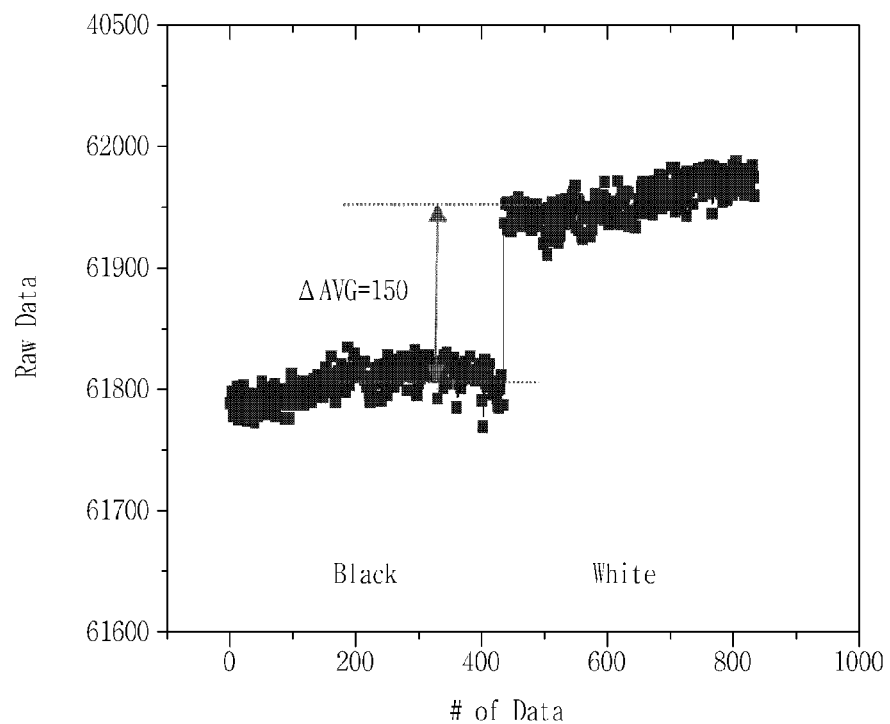
FIG. 2 is a diagram showing a touch raw data difference between a touch sensing block displaying black and a touch sensing block displaying white in the related art in-cell touch type LCD device.
Figure 3:
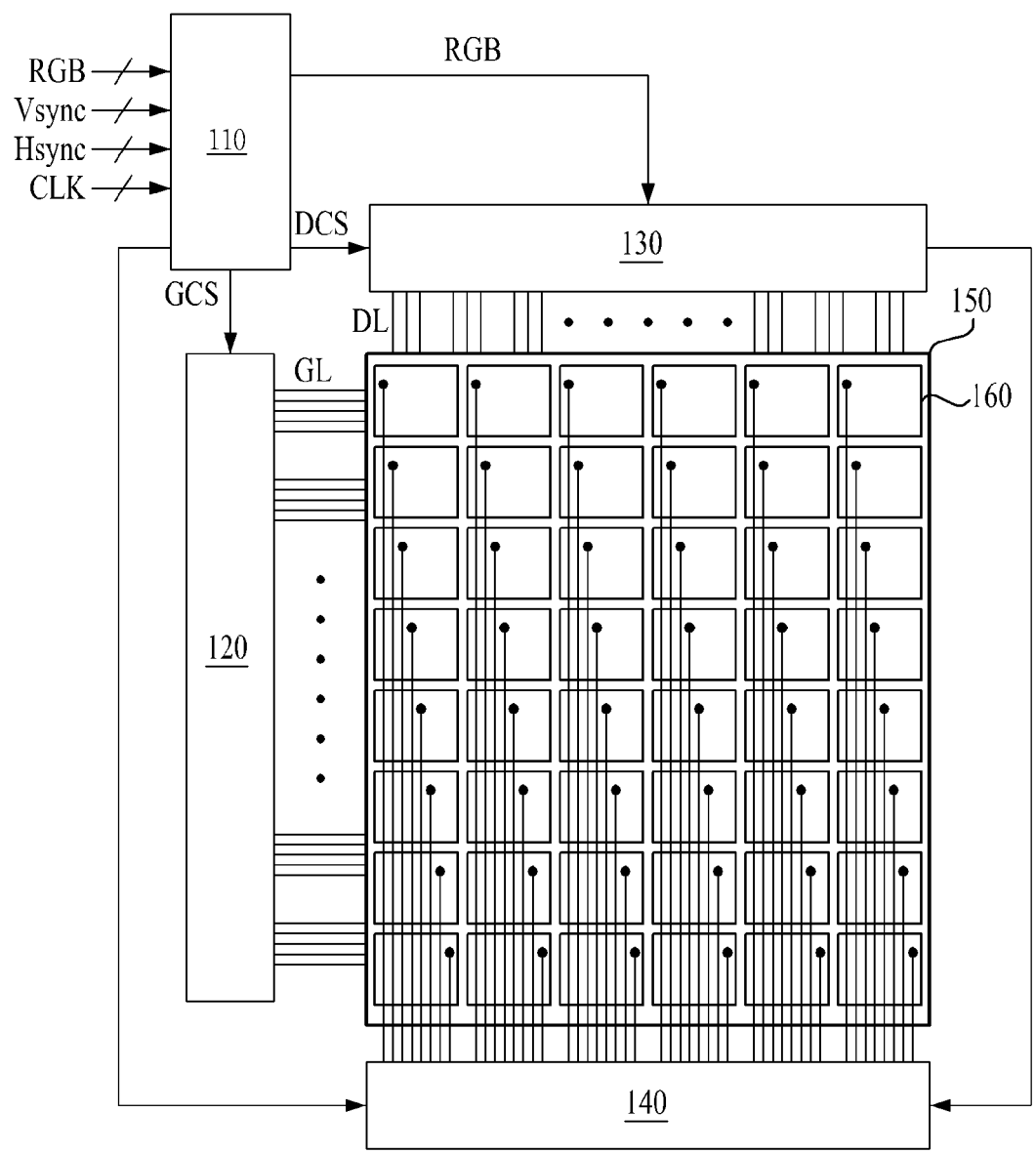
FIG. 3 is a diagram illustrating an embodiment of a display device according to the present invention.

FIG. 3 is a diagram illustrating an embodiment of a display device according to the present invention.

As seen in FIG. 3, a display device 100 according to the present invention includes a timing controller 110, a gate driver 120, a data driver 130, a touch sensing unit 140, a display panel 150, and a plurality of touch sensing blocks 160.

The timing controller 110 temporally divides one frame period and drives the display panel 150 such that a display mode for displaying an image in the display panel 150 and a touch mode for sensing a user's touch are alternately driven.

In the display mode, the timing controller 110 aligns external video signals to convert the video signals into frame-unit digital image data RGB, and supplies the digital image data to the data driver 130.

In the display mode, the timing controller 110 generates a gate control signal GCS for controlling the gate driver 120 and a data control signal DCS for controlling the data driver 130 with a vertical sync signal Vsync, a horizontal sync signal Hsync, and a clock signal CLK which are input from the outside.

The gate control signal GCS is supplied to the gate driver 120, and the data control signal DCS is supplied to the data driver 130.

Here, the data control signal DCS may include a source start pulse SSP, a source sampling clock SSC, a source output enable signal SOE, and a polarity control signal POL.

The gate control signal GCS may include a gate start pulse GSP, a gate shift clock GSC, and a gate output enable signal GOE.

The following description will be made of an operation in which the display mode for displaying an image in the display panel 150 and the touch mode for sensing a user's touch are temporally divided and alternately driven by the timing controller 110 during one frame period.

Figure 5:
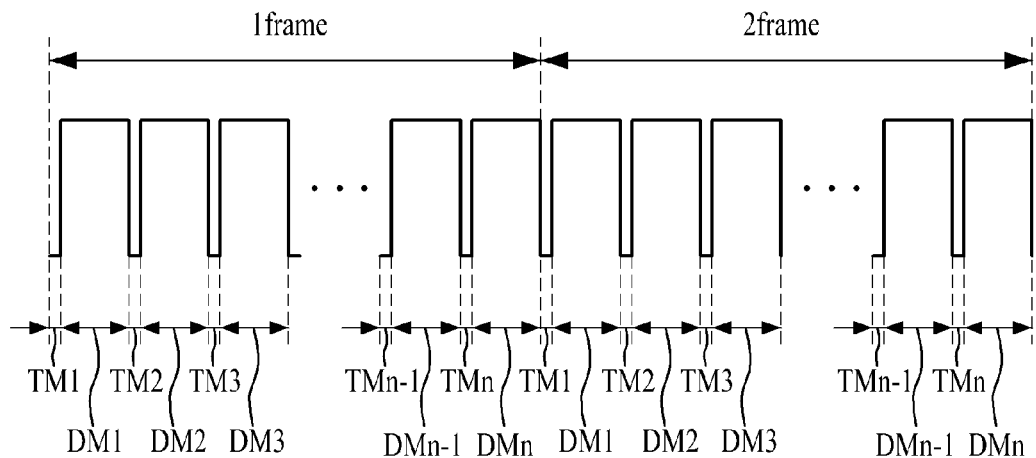
FIG. 5 is a diagram showing that a display mode and a touch mode are time-division driven alternately in the display device according to the present invention.

FIG. 5 is a diagram showing that the display mode and the touch mode are time-division driven alternately in the display device according to the present invention.

As seen in FIG. 5, the timing controller 110 of the display device 100 according to the present invention temporally divides one frame period and time-division drives the display panel 150 such that the display mode DM for displaying an image in the display panel 150 and the touch mode TM for sensing a user's touch are alternately driven.

The display mode denotes a mode for displaying a desired image in the display panel 150, and the touch mode denotes a mode for sensing a touch position of a user that touches the display panel 150.

In an embodiment, when the touch sensing blocks 160 are disposed in n number of rows in a direction parallel to the gate line in the display panel 150, the timing controller 110 alternately drives the touch mode TM and the display mode DM n number of times so as to enable the sensing of a user's touch by using the touch sensing blocks 160 disposed in all rows during one frame.

Specifically, the timing controller 110 drives a touch mode TM1 and a display mode DM1 on a touch sensing block 160 disposed in a first row during one frame period, drives a touch mode TM2 and a display mode DM2 on a touch sensing block 160 disposed in a second row during one frame period, drives a touch mode TM(n-1) and a display mode DM(n-1) on a touch sensing block 160 disposed in an n-1st row during one frame period, and drives a touch mode TMn and a display mode DMn on a touch sensing block 160 disposed in an nth row during one frame period, thereby time-division controlling the touch sensing block 160 disposed in a total of n rows.

According to an embodiment, in a XGA-class TFT-LCD device including 768 gate lines as an example, a time for which a thin film transistor (TFT) connected to a gate line is turned on is 21 usec or less, and, when the TFT is refreshed at a speed of 60 frames per second, one frame time is 16.7 msec. Therefore, the touch mode and the display mode are repeatedly performed at intervals of 16.7 ms.

In this case, the touch mode is maintained for a time relatively shorter than a maintenance time of the display mode. That is, the touch mode is maintained and driven for a short time between the touch mode and the display mode, and thus does not affect the quality of an image displayed by a liquid crystal panel. In an embodiment, the touch mode may be driven for one-tenth, one-fortieth, or less of a time for which the display mode is driven.

The gate driver 120 turns on a plurality of switching elements connected to a gate line for displaying an image in the display mode. In an embodiment, the gate driver 120 may receive a signal from the timing controller 110 to apply a gate high voltage (VGH) to the gate line, thereby turning on the switching elements.

When the switching elements connected to the gate line are turned on, the data driver 130 outputs display data to the data lines. Here, the display data may be grayscale values including grayscale information for displaying an image.

The touch sensing unit 140 determines the user's touch with touch raw data input from adjacent touch sensing blocks 160 in the touch mode.

In an embodiment, the touch sensing unit 140 may determine the user's touch with a differential of display information displayed by the adjacent touch sensing blocks 160 in the display mode, but the display device according to the present invention is not limited thereto.

Hereinafter, the touch sensing unit 140 will be described in more detail with reference to the drawing.

Figure 6:
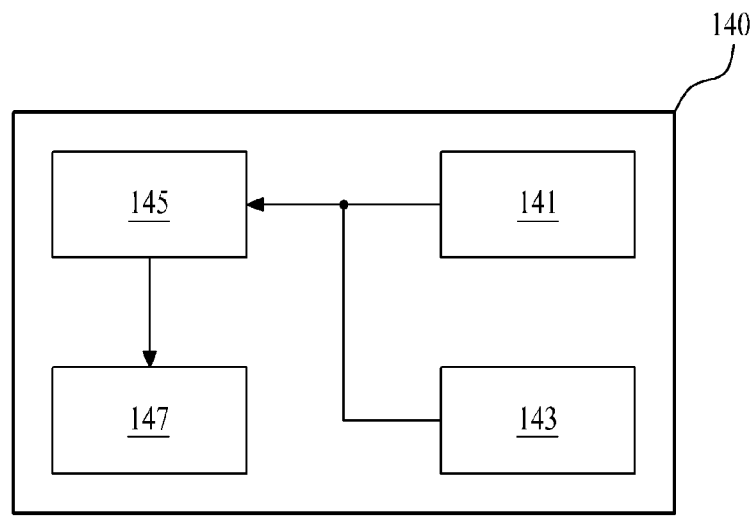
FIG. 6 is a diagram illustrating an embodiment of a touch sensing unit in the display device according to the present invention.

FIG. 6 is a diagram illustrating an embodiment of the touch sensing unit in the display device according to the present invention.

As seen in FIG. 6, in an embodiment, the touch sensing unit 140 of the display device according to the present invention includes a compensation area setting unit 141, a lookup table storage unit 143, a compensation value calculating unit 145, and a touch calculation unit 147. In the touch mode, the touch sensing unit 140 sets a compensation area including at least one touch sensing block that is a sensing unit for a user's touch, and differentially applies DTX compensation values by compensation area to sense the user's touch.

In this case, in an embodiment, the compensation area is set to a predetermined width based on a distance between the data driver 130 and the compensation area, and each of the DTX compensation values is a value for compensating for an error of touch data caused by the changes in respective grayscale values applied to pixels corresponding to a specific touch sensing block.

The compensation area setting unit 141 may compare a DTX compensation value calculated by the compensation value calculating unit 145 and a touch threshold value used by the touch calculation unit 147 to determine the total number of compensation areas to be divided, such that DTX cannot cause an error in touch sensing.

In an embodiment, the compensation area setting unit 141 divides the touch sensing blocks in a row direction, based on a distance separated from the data driver 130. This will be described in more detail with reference to FIG. 7.

Figure 7:
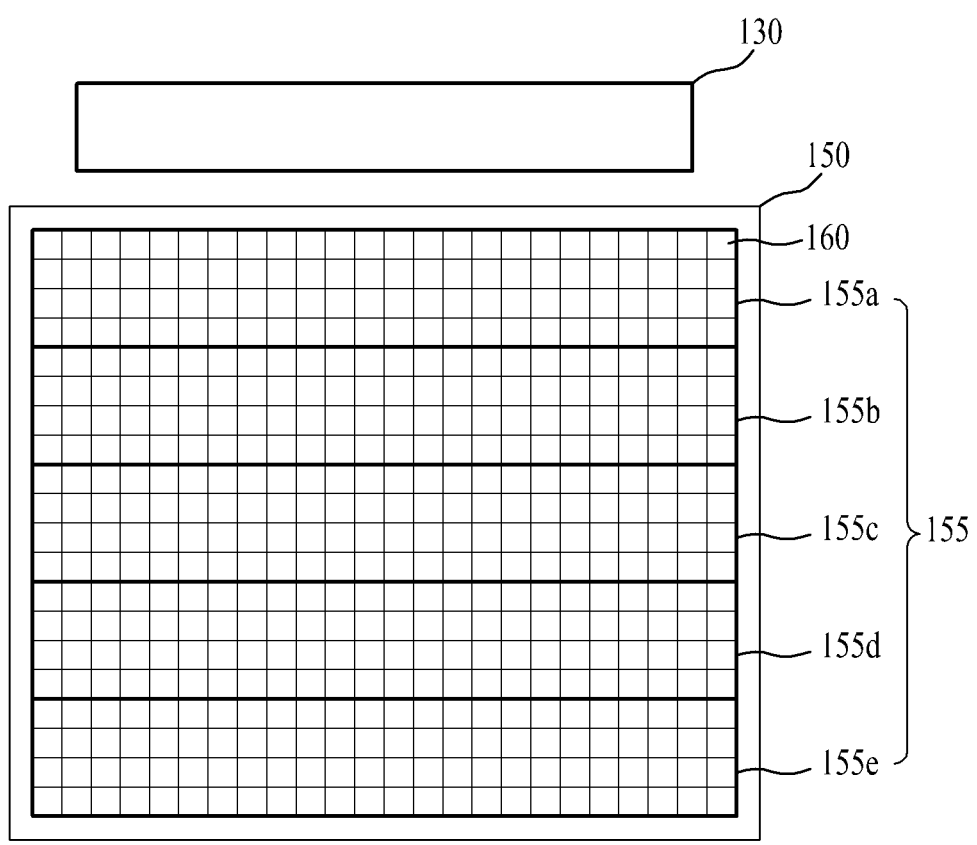
FIG. 7 is a diagram illustrating an embodiment of a compensation area of the display device according to the present invention.

FIG. 7 is a diagram illustrating an embodiment of a compensation area of the display device according to the present invention.

As seen in FIG. 7, a compensation area 155 is set by dividing the touch sensing block 160 in a row direction, based on a distance separated from the data driver 130.

Therefore, in an embodiment, the compensation area 155 may include a first compensation area 155a that includes four rows of a touch sensing block 160 disposed at a position closest to the data driver 130, a second compensation area 155b that includes four rows of a touch sensing block 160 disposed at a position second closest to the data driver 130, a third compensation area 155c that includes four rows of a touch sensing block 160 disposed at a position third closest to the data driver 130, a fourth compensation area 155d that includes four rows of a touch sensing block 160 disposed at a position fourth closest to the data driver 130, and a fifth compensation area 155e that includes four rows of a touch sensing block 160 disposed at a position farthest from the data driver 130.

In another embodiment, the compensation area setting unit 141 divides the touch sensing blocks 160 in a column direction depending on arrangement of multiplexers included in the data driver 130. This will be described in more detail with reference to FIG. 8.

Figure 8:
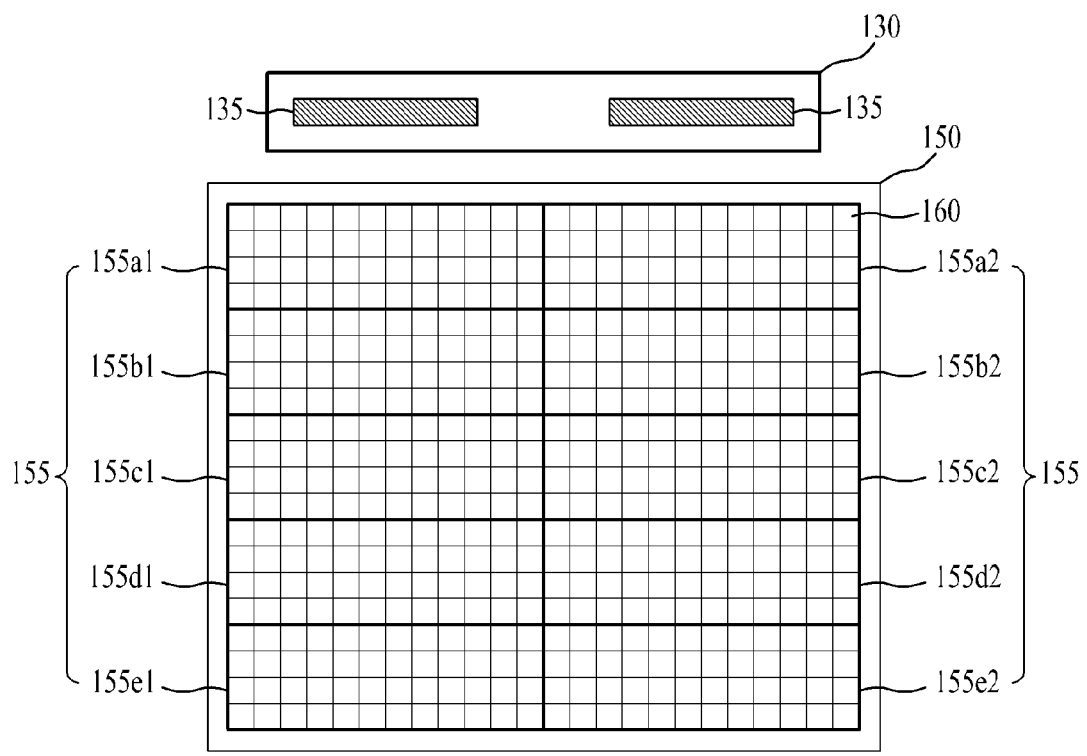
FIG. 8 is a diagram illustrating another embodiment of a compensation area of the display device according to the present invention.

FIG. 8 is a diagram illustrating another embodiment of a compensation area of the display device according to the present invention.

As seen in FIG. 8, a compensation area 155 is set to a predetermined width based on a distance separated from the data driver 130, and a plurality of touch sensing blocks 160 are divided in the column direction depending on arrangement of multiplexers 135 included in the data driver 130.

Therefore, in the embodiment, a first compensation area that includes four rows of a touch sensing block 160 disposed at a position closest to the data driver 130 may be divided into two sub compensation areas 155a1 and 155a2 in the column direction, a second compensation area that includes four rows of a touch sensing block 160 disposed at a position second closest to the data driver 130 may be divided into two sub compensation areas 155b1 and 155b2 in the column direction, a third compensation area that includes four rows of a touch sensing block 160 disposed at a position third closest to the data driver 130 may be divided into two sub compensation areas 155c1 and 155c2 in the column direction, a fourth compensation area that includes four rows of a touch sensing block 160 disposed at a position fourth closest to the data driver 130 may be divided into two sub compensation areas 155d1 and 155d2 in the column direction, and a fifth compensation area that includes four rows of a touch sensing block 160 disposed at a position farthest from the data driver 130 may be divided into two sub compensation areas 155e1 and 155e2 in the column direction.

Referring again to FIG. 6, when the maximum grayscale values are applied to a plurality of pixels corresponding to a specific touch sensing block, the lookup table storage unit 143 may calculate a lookup table obtained by measuring DTX amplitudes that are the changes in touch data generated from the touch sensing block. However, the touch sensing unit 140 according to the present invention need not to include the lookup table storage unit 143, and, depending on a case, the compensation value calculating unit 145 may include a function of a lookup table.

The compensation value calculating unit 145 differentially sets DTX compensation values for DTX compensation according to the compensation area.

In an embodiment, the compensation value calculating unit 145 may differentially set the DTX compensation values in proportion to an average value of DTX amplitudes appearing in the touch sensing block.

The compensation area includes a plurality of touch sensing blocks, and different DTX amplitudes respectively appear in a plurality of pixels corresponding to each of the plurality of touch sensing blocks. The compensation value calculating unit 145 may add up DTX amplitudes appearing in pixels corresponding to a touch sensing block included in one compensation area, and divide the sum of DTX amplitudes by the total number of pixels to calculate an average value of DTX amplitudes (average DTX value) appearing in the pixels included in the one compensation area.

The compensation value calculating unit 145 differentially sets DTX compensation values in proportion to the average DTX value.

In another embodiment, the compensation value calculating unit 145 may multiply an average value of DTX amplitudes (appearing in a specific touch sensing block included in the display panel 150) by a DTX weight based on a position of the compensation area to calculate a DTX compensation value for the compensation area.

The display panel 150 includes the plurality of pixels, and different DTX amplitudes appear in the respective pixels. The compensation value calculating unit 145 may add up DTX amplitudes appearing in all of the pixels overall included in the display panel 150, and divide the sum of DTX amplitudes by the total number of pixels to calculate an average DTX value appearing in the pixels included in the display panel 150.

The compensation value calculating unit 145 multiplies the average DTX value by a DTX weight for each compensation area to differentially set DTX compensation values. Here, the DTX weight may be a value proportional to a distance between the data driver 130 and a corresponding compensation area.

To describe FIG. 7 as an example, a DTX weight of 10% may be set in the first compensation area 155a disposed at a position closest to the data driver 130, a DTX weight of 5% may be set in the second compensation area 155b, a DTX weight of 0% may be set in the third compensation area 155c, a DTX weight of −5% may be set in the fourth compensation area 155d, and a DTX weight of −10% may be set in the fifth compensation area 155e dispose at a position farthest from the data driver 130. However, to provide examples, the weights have been described as numerical values, but are not limited thereto.

The touch calculation unit 147 subtracts the DTX compensation value from a user's touch data measured from the touch sensing block to compensate for the touch data, and compares the touch data and the touch threshold value to calculate whether there is the user's touch.

The touch calculation unit 147 receives touch raw data measured from a specific touch sensing block 160 through a corresponding touch sensing line (RX), and receives the DTX compensation value from the compensation value calculating unit 145.

The DTX compensation value is an error of the touch raw data of the corresponding touch sensing block 160, and thus, the touch calculation unit 147 subtracts the DTX compensation value from the touch raw data to compensate for the touch raw data.

In an embodiment, when the compensated touch raw data are greater than the predetermined touch threshold value, the touch calculation unit 147 determines there to be the user's touch, but, when the compensated touch raw data are equal to or less than the predetermined touch threshold value, the touch calculation unit 147 determines there to be no user's touch.

Referring again to FIG. 3, the display panel 150 includes the plurality of gate lines GL, the plurality of data lines DL, the plurality of pixel electrodes, and the plurality of common electrodes. The display panel 150 displays a desired image in the display mode, and, in the touch mode, the display panel 150 receives a user's touch.

The gate lines GL are arranged on a substrate in one direction, for example, a width direction. The data lines DL are arranged on the substrate in the other direction, for example, a height direction. Thus, the gate lines GL and the data lines DL are arranged to intersect each other, thereby defining a plurality of pixel areas.

For example, each of the pixels may be one of red (R), green (G), blue (B), and white (W) pixels. The data lines DL may be disposed on a layer different from that of the gate lines GL. The data lines DL may be formed in a straight-line shape, but are not limited thereto. As another example, the data lines DL may be formed in a curved-line shape.

Although not shown, a thin film transistor (TFT) is provided as a switching element in each of a plurality of areas in which the data lines DL intersect the gate lines GL. Each of the thin film transistors may include a gate electrode, a semiconductor layer, a source electrode, and a drain electrode. The gate electrode may be connected to a corresponding gate line GL, the source electrode may be connected to a corresponding data line DL, and the drain electrode may face the source electrode to be separated therefrom.

The structure of the thin film transistor may be variously changed like a bottom gate structure in which the gate electrode is disposed under the semiconductor layer or a top gate structure in which the gate electrode is disposed on the semiconductor layer. Also, a shape of each of the electrodes may be changed to various shapes known to those skilled in the art.

A pixel electrode is provided in each of the pixel areas, and electrically connected to the drain electrode of the thin film transistor. Especially, the pixel electrode may be directly connected to the drain electrode, but is not limited to thereto.

The common electrodes receive a common voltage (Vcom) in the display mode displaying an image, thereby enabling the display of an image. Furthermore, in the touch mode sensing a user's touch, the common electrodes are driven as touch electrodes to detect a touch.

Specifically, in the display mode, the common electrodes generate electric fields together with the pixel electrodes to drive a liquid crystal layer. In an embodiment, each of the common electrodes or pixel electrodes may include at least one or more slits in a corresponding pixel area. A fringe field may be generated between a corresponding common electrode and pixel electrode through the slit, and liquid crystal may be driven with the fringe field.

Each common electrode, as described above, generates an electric field to drive the liquid crystal, and moreover, in the touch mode, each common electrode generate a capacitance together with a touch object (for example, a finger or a pen) so as to enable the sensing of a position touched by a user.

Each of the touch sensing blocks 160 is an area recognized as one area according to a user's touch, and may be formed by patterning the common electrodes that are disposed in the display panel 150 and generate electric fields together with the pixel electrodes to enable the display of an image in the display mode.

In this case, the common electrodes generate electric fields together with the pixel electrodes, which are disposed in the respective pixel areas defined by intersection of the gate lines and data lines that are arranged to intersect each other on the substrate, to enable the display of an image during the display mode. In the touch mode, the common electrodes may act as touch electrodes for sensing a changed capacitance due to a user's touch.

<Second Embodiment of Display Device>

Figure 4:
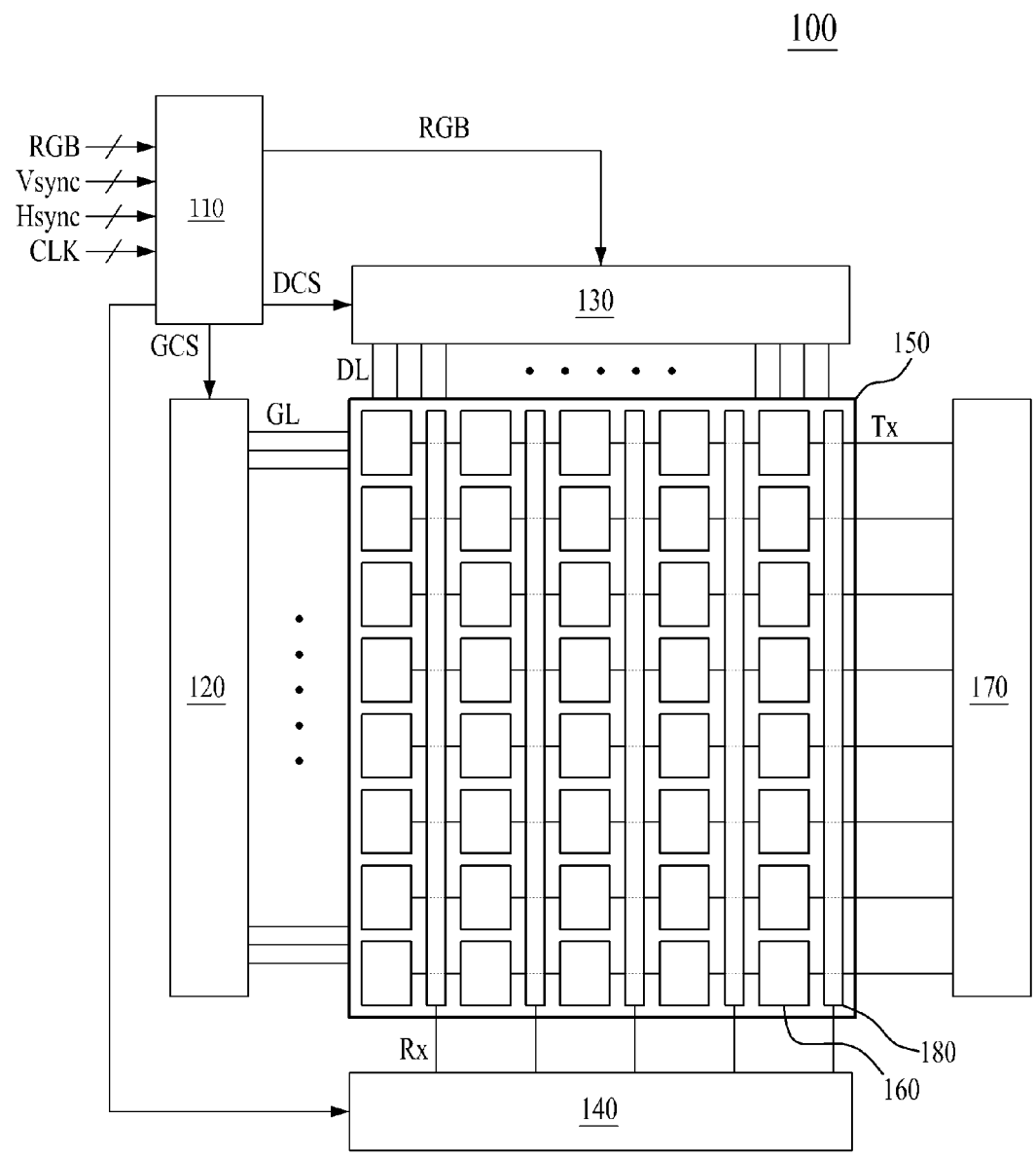
FIG. 4 is a diagram illustrating another embodiment of a display device according to the present invention.

FIG. 4 is a diagram illustrating another embodiment of a display device according to the present invention.

As seen in FIG. 4, a display device 100 according to the present invention includes a timing controller 110, a gate driver 120, a data driver 130, a touch sensing unit 140, a display panel 150, a plurality of touch sensing blocks 160, and a touch driver 170.

The timing controller 110 temporally divides one frame period and drives the display panel 150 such that a display mode for displaying an image in the display panel 150 and a touch mode for sensing a user's touch are alternately driven.

In the display mode, the timing controller 110 aligns external video signals to convert the video signals into frame-unit digital image data RGB, and supplies the digital image data to the data driver 130.

In the display mode, the timing controller 110 generates a gate control signal GCS for controlling the gate driver 120 and a data control signal DCS for controlling the data driver 130 with a vertical sync signal Vsync, a horizontal sync signal Hsync, and a clock signal CLK which are input from the outside.

The gate control signal GCS is supplied to the gate driver 120, and the data control signal DCS is supplied to the data driver 130.

Here, the data control signal DCS may include a source start pulse SSP, a source sampling clock SSC, a source output enable signal SOE, and a polarity control signal POL.

The gate control signal GCS may include a gate start pulse GSP, a gate shift clock GSC, and a gate output enable signal GOE.

The following description will be made of an operation in which the display mode for displaying an image in the display panel 150 and the touch mode for sensing a user's touch are temporally divided and alternately driven by the timing controller 110 during one frame period.

FIG. 5 is a diagram showing that the display mode and the touch mode are time-division driven alternately in the display device according to the present invention.

As seen in FIG. 5, the timing controller 110 of the display device 100 according to the present invention temporally divides one frame period and time-division drives the display panel 150 such that the display mode DM for displaying an image in the display panel 150 and the touch mode TM for sensing a user's touch are alternately driven.

The display mode denotes a mode for displaying a desired image in the display panel 150, and the touch mode denotes a mode for sensing a touch position of a user that touches the display panel 150.

In an embodiment, when the touch sensing blocks 160 are disposed in n number of rows in a direction parallel to the gate line in the display panel 150, the timing controller 110 alternately drives the touch mode TM and the display mode DM n number of times so as to enable the sensing of a user's touch by using the touch sensing blocks 160 disposed in all rows during one frame.

Specifically, the timing controller 110 drives a touch mode TM1 and a display mode DM1 on a touch sensing block 160 disposed in a first row during one frame period, drives a touch mode TM2 and a display mode DM2 on a touch sensing block 160 disposed in a second row during one frame period, drives a touch mode TM(n-1) and a display mode DM(n-1) on a touch sensing block 160 disposed in an n-1st row during one frame period, and drives a touch mode TMn and a display mode DMn on a touch sensing block 160 disposed in an nth row during one frame period, thereby time-division controlling the touch sensing block 160 disposed in a total of n rows.

According to an embodiment, in a XGA-class TFT-LCD device including 768 gate lines as an example, a time for which a thin film transistor (TFT) connected to a gate line is turned on is 21 usec or less, and, when the TFT is refreshed at a speed of 60 frames per second, one frame time is 16.7 msec. Therefore, the touch mode and the display mode are repeatedly performed at intervals of 16.7 ms.

In this case, the touch mode is maintained for a time relatively shorter than a maintenance time of the display mode. That is, the touch mode is maintained and driven for a short time between the touch mode and the display mode, and thus does not affect the quality of an image displayed by a liquid crystal panel. In an embodiment, the touch mode may be driven for one-tenth, one-fortieth, or less of a time for which the display mode is driven.

The gate driver 120 turns on a plurality of switching elements connected to a gate line for displaying an image in the display mode. In an embodiment, the gate driver 120 may receive a signal from the timing controller 110 to apply a gate high voltage (VGH) to the gate line, thereby turning on the switching elements.

When the switching elements connected to the gate line are turned on, the data driver 130 outputs display data to the data lines. Here, the display data may be grayscale values including grayscale information for displaying an image.

The touch sensing unit 140 detects the user's touch with touch data that are input from a corresponding touch sensing blocks 160 through a touch sensing line 180 (RX), in the touch mode.

Hereinafter, the touch sensing unit 140 will be described in more detail with reference to the drawing.

FIG. 6 is a diagram illustrating an embodiment of the touch sensing unit in the display device according to the present invention.

As seen in FIG. 6, in an embodiment, the touch sensing unit 140 of the display device according to the present invention includes a compensation area setting unit 141, a lookup table storage unit 143, a compensation value calculating unit 145, and a touch calculation unit 147. In the touch mode, the touch sensing unit 140 sets a compensation area including at least one touch sensing block that is a sensing unit for a user's touch, and differentially applies DTX compensation values by compensation area to sense the user's touch.

In this case, in an embodiment, the compensation area is set to a predetermined width based on a distance between the data driver 130 and the compensation area, and each of the DTX compensation values is a value for compensating for an error of touch data caused by the changes in respective grayscale values applied to pixels corresponding to a specific touch sensing block.

The compensation area setting unit 141 may compare a DTX compensation value calculated by the compensation value calculating unit 145 and a touch threshold value used by the touch calculation unit 147 to determine the total number of compensation areas to be divided, such that DTX cannot cause an error in touch sensing.

In an embodiment, the compensation area setting unit 141 divides the touch sensing blocks in a row direction, based on a distance separated from the data driver 130. This will be described in more detail with reference to FIG. 7.

FIG. 7 is a diagram illustrating an embodiment of a compensation area of the display device according to the present invention.

As seen in FIG. 7, a compensation area 155 is set by dividing the touch sensing block 160 in a row direction, based on a distance separated from the data driver 130.

Therefore, in an embodiment, the compensation area 155 may include a first compensation area 155*a* that includes four rows of a touch sensing block 160 disposed at a position closest to the data driver 130, a second compensation area 155*b* that includes four rows of a touch sensing block 160 disposed at a position second closest to the data driver 130, a third compensation area 155*c* that includes four rows of a touch sensing block 160 disposed at a position third closest to the data driver 130, a fourth compensation area 155*d* that includes four rows of a touch sensing block 160 disposed at a position fourth closest to the data driver 130, and a fifth compensation area 155*e* that includes four rows of a touch sensing block 160 disposed at a position farthest from the data driver 130.

In another embodiment, the compensation area setting unit 141 divides the touch sensing blocks 160 in a column direction depending on arrangement of multiplexers included in the data driver 130. This will be described in more detail with reference to FIG. 8.

FIG. 8 is a diagram illustrating another embodiment of a compensation area of the display device according to the present invention.

As seen in FIG. 8, a compensation area 155 is set to a predetermined width based on a distance separated from the data driver 130, and a plurality of touch sensing blocks 160 are divided in the column direction depending on arrangement of multiplexers 135 included in the data driver 130.

Therefore, in the embodiment, a first compensation area that includes four rows of a touch sensing block 160 disposed at a position closest to the data driver 130 may be divided into two sub compensation areas 155*a*1 and 155*a*2 in the column direction, a second compensation area that includes four rows of a touch sensing block 160 disposed at a position second closest to the data driver 130 may be divided into two sub compensation areas 155*b*1 and 155*b*2 in the column direction, a third compensation area that includes four rows of a touch sensing block 160 disposed at a position third closest to the data driver 130 may be divided into two sub compensation areas 155*c*1 and 155*c*2 in the column direction, a fourth compensation area that includes four rows of a touch sensing block 160 disposed at a position fourth closest to the data driver 130 may be divided into two sub compensation areas 155*d*1 and 155*d*2 in the column direction, and a fifth compensation area that includes four rows of a touch sensing block 160 disposed at a position farthest from the data driver 130 may be divided into two sub compensation areas 155*e*1 and 155*e*2 in the column direction.

Referring again to FIG. 6, when the maximum grayscale values are applied to a plurality of pixels corresponding to a specific touch sensing block, the lookup table storage unit 143 may calculate a lookup table obtained by measuring DTX amplitudes that are the changes in touch data generated from the touch sensing block. However, the touch sensing unit 140 according to the present invention need not to include the lookup table storage unit 143, and, depending on a case, the compensation value calculating unit 145 may include a function of a lookup table.

The compensation value calculating unit 145 differentially sets DTX compensation values for DTX compensation according to the compensation area.

In an embodiment, the compensation value calculating unit 145 may differentially set the DTX compensation values in proportion to an average value of DTX amplitudes appearing in the touch sensing block.

The compensation area includes a plurality of touch sensing blocks, and different DTX amplitudes respectively appear in a plurality of pixels corresponding to each of the plurality of touch sensing blocks. The compensation value calculating unit 145 may add up DTX amplitudes appearing in pixels corresponding to a touch sensing block included in one compensation area, and divide the sum of DTX amplitudes by the total number of pixels to calculate an average DTX value appearing in the pixels included in the one compensation area.

The compensation value calculating unit 145 differentially sets DTX compensation values in proportion to the average DTX value.

In another embodiment, the compensation value calculating unit 145 may multiply an average value of DTX amplitudes (appearing in a specific touch sensing block included in the display panel 150) by a DTX weight based on a position of the compensation area to calculate a DTX compensation value for the compensation area.

The display panel 150 includes the plurality of pixels, and different DTX amplitudes appear in the respective pixels. The compensation value calculating unit 145 may add up DTX amplitudes appearing in all of the pixels overall included in the display panel 150, and divide the sum of DTX amplitudes by the total number of pixels to calculate an average DTX value appearing in the pixels included in the display panel 150.

The compensation value calculating unit 145 multiplies the average DTX value by a DTX weight for each compensation area to differentially set DTX compensation values. Here, the DTX weight may be a value proportional to a distance between the data driver 130 and a corresponding compensation area.

To describe FIG. 7 as an example, a DTX weight of 10% may be set in the first compensation area 155a disposed at a position closest to the data driver 130, a DTX weight of 5% may be set in the second compensation area 155b, a DTX weight of 0% may be set in the third compensation area 155c, a DTX weight of −5% may be set in the fourth compensation area 155d, and a DTX weight of −10% may be set in the fifth compensation area 115e dispose at a position farthest from the data driver 130. However, to provide examples, the weights have been described as numerical values, but are not limited thereto.

The touch calculation unit 147 subtracts the DTX compensation value from a user's touch data measured from the touch sensing block to compensate for the touch data, and compares the touch data and the touch threshold value to calculate whether there is the user's touch.

The touch calculation unit 147 receives touch raw data measured from a specific touch sensing block 160 through a corresponding touch sensing line (RX), and receives the DTX compensation value from the compensation value calculating unit 145.

The DTX compensation value is an error of the touch raw data of the corresponding touch sensing block 160, and thus, the touch calculation unit 147 subtracts the DTX compensation value from the touch raw data to compensate for the touch raw data.

In an embodiment, when the compensated touch raw data are greater than the predetermined touch threshold value, the touch calculation unit 147 determines there to be the user's touch, but, when the compensated touch raw data are equal to or less than the predetermined touch threshold value, the touch calculation unit 147 determines there to be no user's touch.

Referring again to FIG. 4, the display panel 150 includes the plurality of gate lines GL, the plurality of data lines DL, the plurality of pixel electrodes, and the plurality of common electrodes. The display panel 150 displays a desired image in the display mode, and, in the touch mode, the display panel 150 receives a user's touch.

The gate lines GL are arranged on a substrate in one direction, for example, a width direction. The data lines DL are arranged on the substrate in the other direction, for example, a height direction. Thus, the gate lines GL and the data lines DL are arranged to intersect each other, thereby defining a plurality of pixel areas.

For example, each of the pixels may be one of red (R), green (G), blue (B), and white (W) pixels. The data lines DL may be disposed on a layer different from that of the gate lines GL. The data lines DL may be formed in a straight-line shape, but are not limited thereto. As another example, the data lines DL may be formed in a curved-line shape.

Although not shown, a thin film transistor (TFT) is provided as a switching element in each of a plurality of areas in which the data lines DL intersect the gate lines GL. Each of the thin film transistors may include a gate electrode, a semiconductor layer, a source electrode, and a drain electrode. The gate electrode may be connected to a corresponding gate line GL, the source electrode may be connected to a corresponding data line DL, and the drain electrode may face the source electrode to be separated therefrom.

The structure of the thin film transistor may be variously changed like a bottom gate structure in which the gate electrode is disposed under the semiconductor layer or a top gate structure in which the gate electrode is disposed on the semiconductor layer. Also, a shape of each of the electrodes may be changed to various shapes known to those skilled in the art.

A pixel electrode is provided in each of the pixel areas, and electrically connected to the drain electrode of the thin film transistor. Especially, the pixel electrode may be directly connected to the drain electrode, but is not limited to thereto.

The common electrodes receive a common voltage (Vcom) in the display mode displaying an image, thereby enabling the display of an image. Furthermore, in the touch mode sensing a user's touch, the common electrodes are driven as touch electrodes to detect a touch.

Specifically, in the display mode, the common electrodes generate electric fields together with the pixel electrodes to drive a liquid crystal layer. In an embodiment, each of the common electrodes or pixel electrodes may include at least one or more slits in a corresponding pixel area. A fringe field may be generated between a corresponding common electrode and pixel electrode through the slit, and liquid crystal may be driven with the fringe field.

Each common electrode, as described above, generates an electric field to drive the liquid crystal, and moreover, in the touch mode, each common electrode generate a capacitance together with a touch object (for example, a finger or a pen) so as to enable the sensing of a position touched by a user.

Each of the touch sensing blocks 160 is an area recognized as one area according to a user's touch, and may be formed by patterning the common electrodes that are disposed in the display panel 150 and generate electric fields together with the pixel electrodes to enable the display of an image in the display mode.

In this case, the common electrodes generate electric fields together with the pixel electrodes, which are disposed in the respective pixel areas defined by intersection of the gate lines and data lines that are arranged to intersect each other on the substrate, to enable the display of an image during the display mode. In the touch mode, the common electrodes may act as touch electrodes for sensing a changed capacitance due to a user's touch.

The touch driver 170 receives a signal from the timing controller 110 to apply a driving signal to the touch sensing blocks 160 through a plurality of touch driving lines (TX), in the touch mode.

Each of a plurality of touch sensing lines 180 (RX) is a portion of the patterned common electrode or is an electrode formed separately from the common electrode. The touch sensing unit 140 connected to the touch sensing lines (RX) senses a capacitance change caused by a user's touch. The touch sensing lines (RX) may be arranged in parallel to a direction of the data line.

The touch driving lines (TX) and the touch sensing lines (RX) configure touch electrodes by division of the common electrodes, and thus may be disposed on the same layer. However, the display device according to the present invention is not limited thereto.

When a user touches the display panel 150, a capacitance is changed by an electric field generated in a corresponding touch driving line (TX) and a corresponding touch sensing line (RX). At this point, the touch sensing unit 140 determines whether there is the user's touch with the capacitance change.

Hereinafter, effects of the present invention will be described with reference to FIGS. 9 to 11.

Figure 9A:
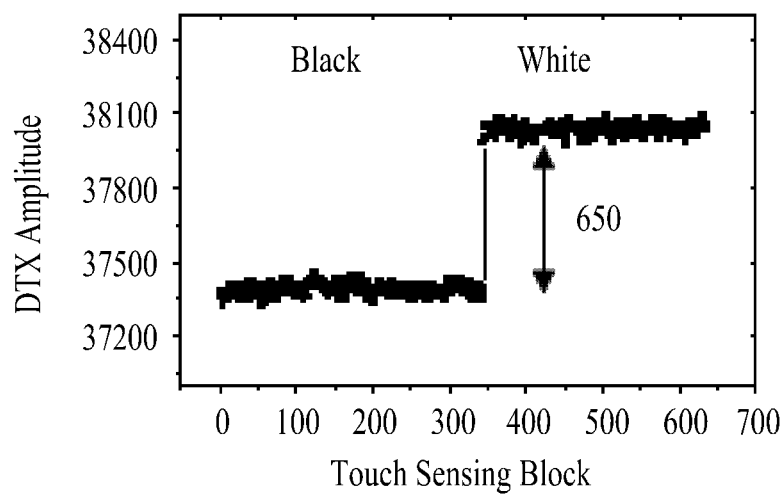
FIGS. 9A to 9C are graphs DTX amplitudes measured before DTX compensation according to the display device according to the present invention.
Figure 9B:
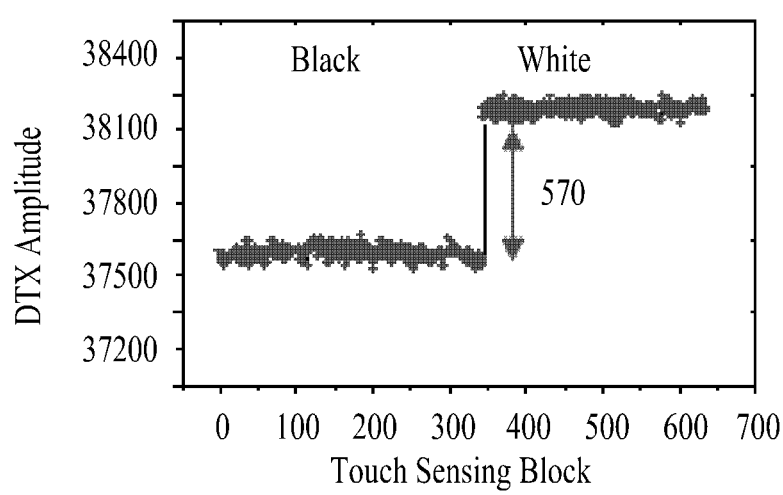
Figure 9C:
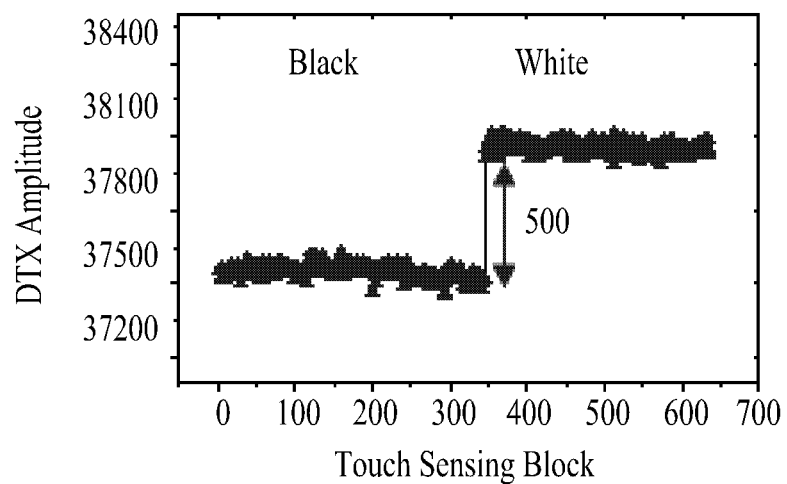

FIGS. 9A to 9C are graphs DTX amplitudes measured before DTX compensation according to the display device according to the present invention.

FIG. 9A shows DTX amplitudes appearing in the touch sensing blocks when a data voltage corresponding to black is applied and when a data voltage corresponding to white is applied, in a compensation area closest to the data driver 130. As seen in FIG. 9A, it can be seen that there is a difference of about 650 between the DTX amplitudes of the two cases.

FIG. 9B shows DTX amplitudes appearing in the touch sensing blocks when a data voltage corresponding to black is applied and when a data voltage corresponding to white is applied, in a compensation area second closest to the data driver 130. As seen in FIG. 9B, it can be seen that there is a difference of about 570 between the DTX amplitudes of the two cases.

FIG. 9C shows DTX amplitudes appearing in the touch sensing blocks when a data voltage corresponding to black is applied and when a data voltage corresponding to white is applied, in a compensation area farthest from the data driver 130. As seen in FIG. 9C, it can be seen that there is a difference of about 500 between the DTX amplitudes of the two cases.

As seen in FIGS. 9A to 9C, it can be seen that a DTX amplitude difference decreases as measured from compensation areas progressively farther from the data driver 130.

Figure 10A:
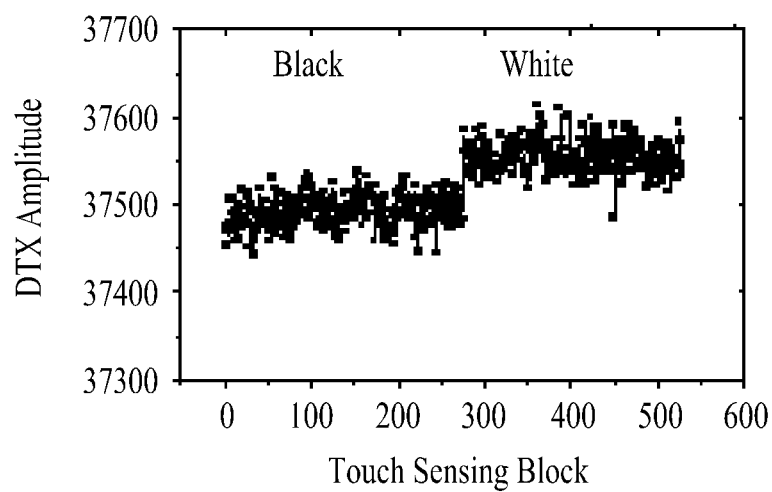
FIGS. 10A to 10C are graphs DTX amplitudes measured when DTX is compensated for without division of compensation areas, in the display device according to the present invention.
Figure 10B:
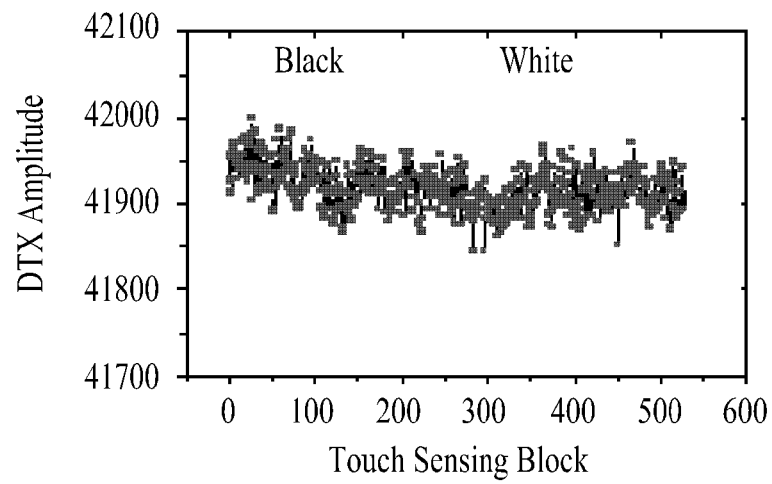
Figure 10C:
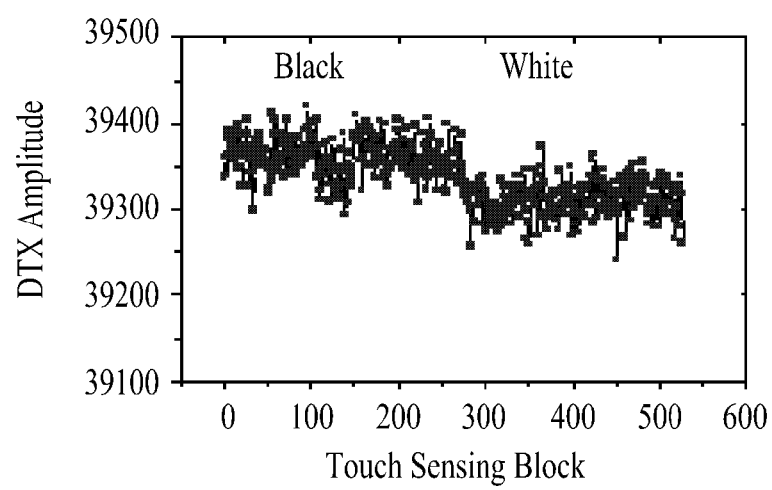

FIGS. 10A to 10C are graphs DTX amplitudes measured when DTX is compensated for without division of compensation areas, in the display device according to the present invention.

It can be seen that relative uniform compensation is achieved in FIG. 10B when batch compensation is performed without using the present invention for compensating for DTX, but, as shown in FIGS. 10A and 10C, there still is a differential due to a DTX amplitude in an area farther from the center.

Figure 11A:
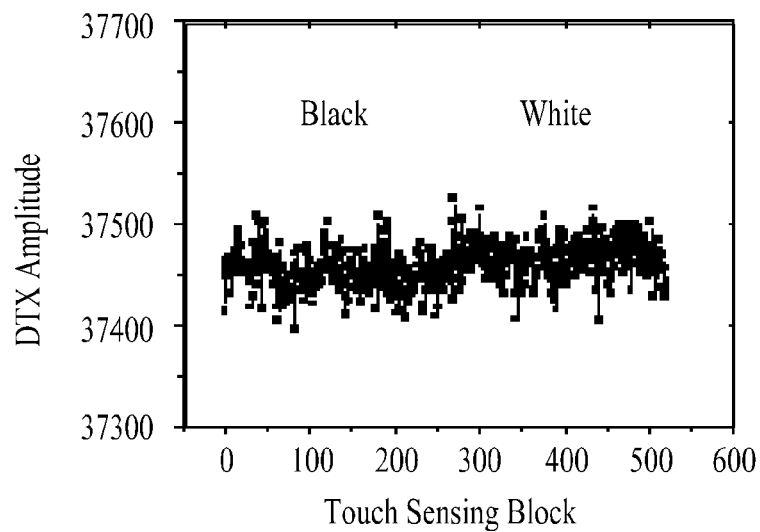
FIGS. 11A to 11C are graphs showing compensation results of DTX amplitudes measured for divided compensation areas, in the display device according to the present invention.
Figure 11B:
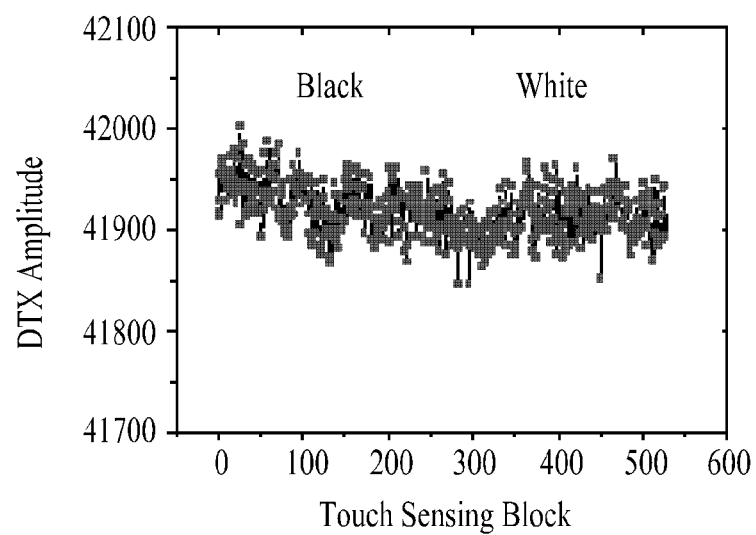
Figure 11C:
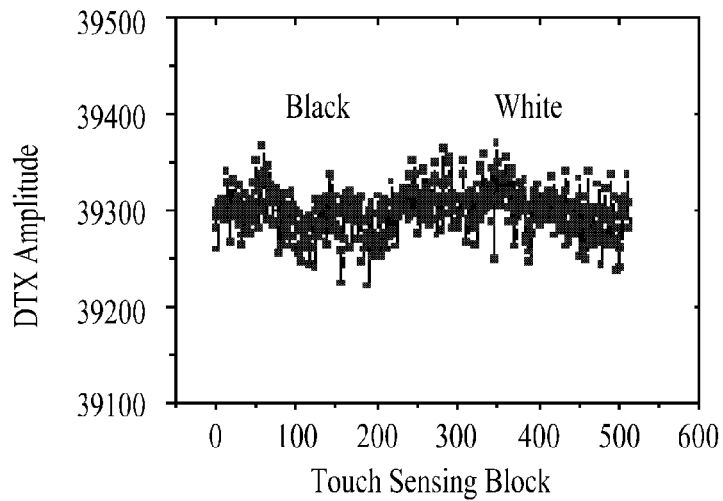

FIGS. 11A to 11C are graphs showing compensation results of DTX amplitudes measured for divided compensation areas, in the display device according to the present invention.

As seen in FIGS. 11A to 11C, it can be seen that, when the display device according to the present invention differentially compensates for DTX amplitudes by dividing the compensation areas, an input error of touch data due to DTX is reduced irrespective of a distance from the data driver 130.

<Touch Sensing Method of Display Device>

Hereinafter, a touch sensing method of the display device according to the present invention will be described in detail with reference to the drawing.

Figure 12:
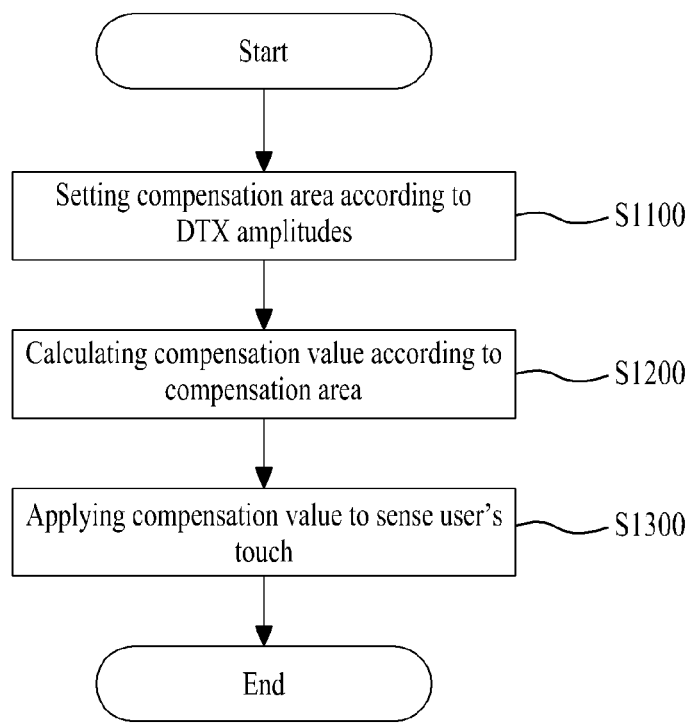
FIG. 12 is a flowchart illustrating an embodiment of a touch sensing method of the display device according to the present invention.

FIG. 12 is a flowchart illustrating an embodiment of a touch sensing method of the display device according to the present invention.

As seen in FIG. 12, the touch sensing method of the display device according to the present invention temporally divides one frame period and drives the display panel 150 such that the display mode for displaying an image in the display panel 150 and a touch mode for sensing a user's touch are alternately driven.

To provide a detailed description on this, first, the display device sets a plurality of compensation areas according to DTX amplitudes in operation (S1100).

In an embodiment, the display device may set the compensation areas including at least one touch sensing block that is a sensing unit for a user's touch, based on a distance from the data driver 130.

In another embodiment, the display device may divide the compensation areas in the row direction based on a distance from the data driver 130, and divide the compensation areas in the column direction depending on arrangement of the multiplexers included in the data driver 130.

Subsequently, the display device differentially applies DTX compensation values by compensation area in operation S1200.

In an embodiment, the display device may multiply an average value of DTX amplitudes (appearing in a specific touch sensing block included in the display panel 150) by a DTX weight based on a position of the compensation area to calculate different DTX compensation values for the compensation areas.

Subsequently, the display device senses a user's touch with the DTX compensation values in operation S1300.

The display device subtracts the DTX compensation value from a user's touch data measured from the touch sensing block to compensate for the touch data, and compares the touch data and the touch threshold value to calculate whether there is the user's touch.

As described above, the present invention corrects display touch crosstalk, thereby removing noise from a touch signal.

Moreover, noise of a touch signal is reduced, thus enhancing a touch sensing rate by a user.

Moreover, noise of a touch signal is reduced, thus enhancing accuracy of touch sensing by a user.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device, comprising:
    a timing controller temporally dividing one frame period and driving a display panel such that a display mode for displaying an image in the display panel and a touch mode for sensing a user's touch are alternately driven;
    a data driver receiving digital image data from the timing controller and outputting display data to data lines of the display panel; and
    a touch sensing unit setting a plurality of compensation areas comprising at least one or more touch sensing blocks, and differentially applying DTX (display touch crosstalk) compensation values by compensation area to sense the user's touch in the touch mode, each of the touch sensing blocks being a sensing unit for a user's touch, wherein,
    each of the compensation areas is set to a predetermined width in a row direction based on a distance between the data driver and the compensation area,
    each of the DTX compensation values is a value for compensating for an error of touch data caused by changes in respective grayscale values applied to pixels corresponding to a specific touch sensing block, and
    the touch sensing blocks are set to a predetermined width in a column direction based on the data line connections to a multiplexor comprised in the data driver.

2. The display device of claim 1, wherein the touch sensing unit comprises a lookup table storage unit calculating, when maximum grayscale values are applied to a plurality of pixels corresponding to a specific touch sensing block, a lookup table obtained by measuring DTX amplitudes that are changes in touch data generated from the touch sensing block.

3. The display device of claim 1, wherein the touch sensing unit comprises a compensation value calculating unit differentially setting the DTX compensation values in proportion to an average value of DTX amplitudes appearing in the touch sensing blocks.

4. The display device of claim 1, wherein the touch sensing unit comprises a compensation value calculating unit multiplying an average value of DTX amplitudes, appearing in a specific touch sensing block comprised in the display panel, by a DTX weight based on a position of a corresponding compensation area to calculate a DTX compensation value for the compensation area.

5. The display device of claim 1, wherein the touch sensing unit comprises a touch calculation unit subtracting a DTX compensation value from the user's touch data measured from a specific touch sensing block to compensate for the touch data, and comparing the touch data and a touch threshold value to calculate whether there is the user's touch.

6. A touch sensing method of a display device, which temporally divides one frame period and drives a display panel such that a display mode for displaying an image in the display panel and a touch mode for sensing a user's touch are alternately driven, the touch sensing method comprising:

setting a plurality of compensation areas, comprising at least one or more touch sensing blocks, based on a distance separated from a data driver in the touch mode, each of the touch sensing blocks being a sensing unit for a user's touch; and differentially applying DTX (display touch crosstalk) compensation values by compensation area to sense the user's touch, wherein each of the DTX compensation values is a value for compensating for an error of touch data caused by changes in respective grayscale values applied to pixels corresponding to a specific touch sensing block, and wherein the setting of a plurality of compensation areas comprises dividing the compensation areas in a row direction based on a distance from the data driver, and dividing the compensation areas in a column direction based on the data line connections to a multiplexer comprised in the data driver.

7. The touch sensing method of claim 6, wherein the sensing of the user's touch comprises multiplying an average value of DTX amplitudes, appearing in the touch sensing blocks comprised in the display panel, by DTX weights based on positions of the compensation areas to calculate different DTX compensation values for the compensation areas.

* * * * *